United States Patent [19]
Buchmeier et al.

[11] Patent Number: 5,350,517
[45] Date of Patent: Sep. 27, 1994

[54] METHOD OF RECYCLING PHOSPHATING SLUDGES

[75] Inventors: Willi Buchmeier, Duesseldorf; Wolf A. Roland, Solingen, both of Fed. Rep. of Germany

[73] Assignee: Henkel Kommanditgesellschaft auf Aktien, Duesseldorf, Fed. Rep. of Germany

[21] Appl. No.: 39,290
[22] PCT Filed: Oct. 10, 1991
[86] PCT No.: PCT/EP91/01925
§ 371 Date: Apr. 19, 1993
§ 102(e) Date: Apr. 19, 1993
[87] PCT Pub. No.: WO92/07106
PCT Pub. Date: Apr. 30, 1992

[30] Foreign Application Priority Data

Oct. 18, 1990 [DE] Fed. Rep. of Germany ....... 4032956

[51] Int. Cl.$^5$ ............................................. B01D 11/04
[52] U.S. Cl. ..................................... 210/638; 210/197
[58] Field of Search ................... 423/299, 24; 210/634, 210/638, 511, 197, 195.1

[56] References Cited

U.S. PATENT DOCUMENTS 3,989,607 11/1976 Bush et al. ............................. 423/24
5,198,020 3/1993 Fennemann et al. ................ 423/299

FOREIGN PATENT DOCUMENTS 0090119 12/1982 European Pat. Off. .
2629776 1/1977 Fed. Rep. of Germany .
3002830 7/1981 Fed. Rep. of Germany .
2317221 2/1977 France .

*Primary Examiner*—Frank Spear
*Attorney, Agent, or Firm*—Ernest G. Szoke; Wayne C. Jaeschke; Norvell E. Wisdom, Jr.

[57] ABSTRACT

Described is a method of recycling the sludge which arises during the zinc phosphating of steel surfaces. The sludge is preferably digested with nitric acid, the iron selectively extracted from the digested solution with liquid/liquid extraction and the extract thus obtained reused in the preparation of zinc phosphating solution. The preferred extraction solvent is a solution of the monoester of 2-ethylhexyl alcohol with phosphoric acid in kerosene.

20 Claims, No Drawings

METHOD OF RECYCLING PHOSPHATING SLUDGES

FIELD OF THE INVENTION

This invention relates to a process for recycling the phosphating sludge which accumulates in the Zn phosphating of metal surfaces, more particularly steel surfaces, by treatment of the phosphating sludge with mineral acid, removal of constituents and their reuse in the preparation of phosphating solutions.

STATEMENT OF RELATED ART

Before lacquering, metal workpieces (mainly steel sheets) are subjected to a number of pretreatments, comprising cleaning and degreasing steps and subsequent phosphating. In the phosphating process, a conversion layer consisting, for example, of Zn phosphate (hopeite) or Zn/Fe phosphate (phosphophyllite), depending on the external conditions, is produced on the metal surface by immersion in a zinc phosphate bath which may additionally contain other dissolved metals, such as Ca, Mn, Ni, and the like. The conversion layer formed serves on the one hand as protection against corrosion and on the other hand as a basis for better lacquer adhesion. Phosphate coatings are also applied as lubricants for the cold forming of workpieces.

In the phosphating process, small quantities of iron from the steel surface are also inevitably dissolved. To keep the Fe concentration constant, an oxidizing agent (accelerator) is added to the phosphating bath to oxidize $Fe^{2+}$ to $Fe^{3+}$, which then precipitates from the phosphating solution as iron phosphate sludge. Other constituents of the phosphating bath are entrained in the process.

After drying at 110° C., the phosphating sludge generally has the following composition in % by weight: iron about 20, zinc about 10, manganese about 1-3, nickel <1, phosphate 50-55.

It is known that the phosphating sludge can be processed and utilized in various ways, namely: as an additive for coating compositions which also have certain corrosion-inhibiting properties; for solidifying lacquer coagulates from spray lacquering; by pyrometallurgical processing, for example by reduction sintering processes, for recovering the metals zinc, iron and nickel in addition to sodium phosphate; and by wet-chemical processing by leaching constituents with acids and bases and reusing them in the preparation of phosphating solutions; and, finally, by digestion with mineral acid, removal of constituents and their reuse.

DE-OS 26 29 776 describes a process for recycling zinc phosphating solutions for steel in which zinc and phosphate ions are leached from the sludge with mineral acid at a pH value of 1.4 to 1.6 and the acidic liquor obtained is used as a phosphating solution (see claims 1, 3, 4 and 12). The phosphate is leached from the undissolved residue containing iron and phosphate ions with alkali so that, ultimately, an iron-containing residue remains behind. The phosphate in the alkaline liquor is precipitated as zinc phosphate and may also be used for the preparation of phosphating solutions. This process has the following disadvantage: the leaching with mineral acid is incomplete. Alkali metal ions are entrained in the subsequent leaching of the $FePO_4$ filter cake, increase in concentration and make repeated recycling impossible.

Powell, Smith and Cochran describe a process for liquid/liquid extraction from a sludge digestion solution in hydrochloric acid. The iron is separated as $FeCl_3$ with isopropyl ether. Zinc is then extracted with di-2-ethylhexyl phosphoric acid (DEHPA) in kerosine. Finally, the phosphoric acid is recovered by crystallizing out the raffinate as $Na_3PO_4$. The constituents are recycled. This known process has the following disadvantage: the liquid/liquid extraction uses two different extractants and is relatively expensive. After crystallization of the $Na_3PO_4$, $Na^+$ $Cl^-$ and Mn and Ni ions remain in the raffinate; recycling is not complete.

DESCRIPTION OF THE INVENTION

1. Object of the Invention

The problem addressed by the present invention was largely to avoid the disadvantages mentioned above and to find a simple and complete method of separating the phosphating sludge into its constituents so that its useful constituents could be returned to the phosphating process (recycling).

2. Summary of the Invention

The invention is essentially based on the idea of removing only iron from the phosphating sludge and reusing the rest. To this end, the sludge has to be dissolved beforehand.

The present invention relates to a process for recycling phosphating sludge from the zinc phosphating of metal surfaces, particularly steel surfaces, the phosphating sludge being digested with mineral acid, the iron being selectively separated by liquid/liquid extraction and the raffinate thus obtained being reused for preparation of the zinc phosphating solution.

DESCRIPTION OF PREFERRED EMBODIMENTS

In the context of the invention, "digestion" is the conversion of the phosphating sludge into an aqueous mineral acid solution. The "mineral acid" is hydrochloric acid, nitric acid or sulfuric acid, preferably nitric acid. The digestion step is generally carried out as follows: a concentrated acid is added to the phosphating sludge and the mixture is heated with stirring for 5 to 10 minutes to a temperature of 40° to 50° C. The solution is then diluted with water until it has a pH value of at most 0.85 and preferably 0.4 to 0.7. The digestion solution obtained may initially be a little clouded although, after extraction, it must be clear in equilibrium with the extractant.

The extractant consists essentially of an organic solvent, a complexing agent and, optionally, a solubilizer. The organic solvent should be insoluble in water and should effectively dissolve the complexing agent and the complex. The expression "insoluble in water" is intended to mean that the solvent is substantially insoluble in water, i.e. less than 100 ppm and, more particularly, less than 10 ppm of the solvent is soluble in water. Suitable solvents are, for example, chlorinated hydrocarbons, such as methylene chloride, chloroform and carbon tetrachloride, and aliphatic, cycloaliphatic and aromatic hydrocarbons, such as benzene, toluene, xylene, substituted naphthalenes, hexane, cyclohexane (decalin), gasoline, kerosine, petroleum and diesel fuel. Preferred solvents are aliphatic and aromatic kerosines, as known to the expert on the subject of liquid/liquid extraction. The kerosines ESCAID 120 and Solvesso 150 (EXXON) are mentioned as examples. The solubilizers are branched or unbranched alcohols or alkyl phenols containing 4 to 20 and preferably 6 to 16 carbon atoms in the alkyl group. Examples of preferred solubilizers are the straight-chain alcohols decanol to tridecanol and branched isomers thereof and—as alkyl phenols—nonyl phenol and dodecyl phenol containing linear or branched alkyl radicals.

The extractant contains dissolved acids of phosphorus as complexing agents for iron in a concentration of 1 to 500 and preferably 10 to 100 g/l. According to the invention, these complexing agents may be one or more different acids of phosphorus corresponding to the following general formula:

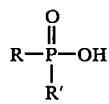

in which R and R'=OH, alkyl, aralkyl, alkoxy and alkylphenoxy; R and R' may be the same or different, but cannot both be OH.

The following group is preferred: phosphoric acid monoalkyl or dialkyl esters, alkyl phosphonic acid monoalkyl esters and dialkyl phosphinic acid either individually or in admixture, the dialkyl group containing 4 to 20 carbon atoms and preferably 6 to 16 carbon atoms. The alkyl radicals are preferably branched or cyclic and, more preferably, branched and acyclic. The preferred complexing agent is phosphoric acid mono-2-ethylhexyl ester. Other complexing agents are phosphoric acid di-2-ethylhexyl ester, 2-ethylhexyl phosphoric acid mono-2-ethylhexyl ester, phosphoric acid monoalkyl and dialkyl esters of medium chain length, bis-(2,4,4-trimethylpentyl)-phosphinic acid. These complexing agents are commercially available or may readily be produced by known methods. Their suitability for the extraction of metal ions is also known (see G. P. Demopoulos and G. Pouskouleli, *Can. Met. Quart.* 28(1), 13–18 (1989) or B. E. Johnston in *Chemistry and Industry* 1988, 656–660.

The liquid/liquid extraction is preferably carried out at room temperature, although it may also be carried out at temperatures of 10° to 90° C. Both continuous and discontinuous extraction are possible. The ratio of aqueous to organic phase may vary within wide limits, for example from 1:10 to 10:1. The ratio is preferably from 2 to 0.5:1.

Almost complete removal of the iron from the digestion solution (less than 0.1 g/l) is possible with the preferred complexing agents. Nevertheless, re-extraction is possible. By virtue of its high selectivity, only very small quantities of other metal ions are co-extracted.

Accordingly, the raffinate largely contains all the constituents of the phosphating solution and, in addition, the mineral acid used for digestion. Accordingly, in the case of high-nitrate treatment baths, it may optionally be directly recycled to the phosphating process and used for the preparation of a new phosphating bath or a regeneration solution for a spent phosphating bath. Nitric acid is preferably used for digestion because nitrate ions are in any case used as accelerators or stabilizers in many phosphating processes. However, the recovered solution of useful material may also be used as starting material in the production of new phosphating products.

To recover the organic phase, the iron is re-extracted therefrom with a mineral acid. Hydrochloric acid is preferably used, in a concentration of 0.1 to 10 moles/l and preferably in a concentration of 8 to 2 moles/l. With a slightly weaker extractant, such as for example EHEHPA or a phosphinic acid, re-extraction may also be carried out with other mineral acids, such as $H_2SO_4$. The iron may be recovered from the re-extraction solution in solid form by spray roasting of the concentrated iron chloride solution in hydrochloric acid by known methods. It may be used as an aggregate in the building industry or steel industry, but may also be safely disposed of as waste.

The process according to the invention is distinguished by its considerable effectiveness to which the complete and selective separation of iron makes a particular contribution. The recycling aspect, including the auxiliaries used, also contributes the economy of the process. Further advantages include a drastic reduction in volume of the extracted iron product for disposal as waste. The re-extracted solution, which consists mainly of $FeCl_3$ and HCl, may also be put to other uses, for example as a flocculation aid in wastewater treatment, etc.

The invention is illustrated by the following Example. The metal concentrations were determined by X-ray fluorescence and atomic absorption.

EXAMPLE

A) Digestion of the Phosphating Sludge

TABLE I

| Composition of the phosphating sludge | |
|---|---|
| Constituents | % by weight |
| Fe | 9.5 |
| Zn | 5.6 |
| Mn | 1.3 |
| Ni | 0.3 |
| P | 9.9 |
| $H_2O$ | 50 |

17 g of the sludge having the composition shown in Table I were dissolved with stirring in 20 ml of 7 moles/l (semiconcentrated) $HNO_3$ over a period of 5 to 10 minutes at 40° to 50° C. After dilution to 500 ml and filtration, the solution contained 3.2 g/l of Fe, 0.4 g/l of Mn, 0.1 g/l of Ni, 1.9 g/l of Zn, 10.2 g/l of $PO_4^{3-}$ and 17.4 of $NO_{3-}$ at a pH value of 0.7 to 0.75 and was sufficiently stable against precipitation.

B) Extraction of the Digestion Solution

Organic and aqueous phases were contacted for 15 minutes at 20° C. in a vibrating funnel, kerosine (ESCAID 120, Exxon) in a ratio by volume to the aqueous phase of 1:1 being used as the organic solvent. Depending on the complexing agent and its concentration, the following analysis results (in g/l) were obtained:

1) 2.5% by weight of phosphoric acid mono-2-ethylhexyl ester (MEHPA, "Ester 191", Hoechst)

| Metal | Aqueous phase Before | Aqueous phase After | | Organic phase After |
|---|---|---|---|---|
| Fe | 3.2 | 0.5 | | 2.7 |
| Zn | 1.9 | 1.8 | | 0.1 |
| Mn | 0.4 | 0.4 | << | 0.1 |
| Ni | 0.1 | 0.1 | << | 0.1 |
| 2a) 0.5 mole/l of phosphoric acid di-2-ethylhexyl ester (DEHPA, "Hostarex PA 216", Hoechst) | | | | |
| Fe | 3.2 | 0.1 | | 3.1 |
| Zn | 1.9 | 1.9 | << | 0.1 |
| Mn | 0.4 | 0.4 | << | 0.1 |
| Ni | 0.1 | 0.1 | << | 0.1 |

-continued

| Metal | Aqueous phase Before | Aqueous phase After | | Organic phase After |
|---|---|---|---|---|
| 2b) 0.2 mole/l of DEHPA | | | | |
| Fe | 3.2 | 1.5 | | 1.7 |
| Zn | 1.9 | 1.8 | | 0.1 |
| Mn | 0.4 | 0.4 | << | 0.1 |
| Ni | 0.1 | 0.1 | << | 0.1 |
| 3) 0.2 mole/l of 2-ethylhexyl phosphonic acid mono-2-ethylhexyl ester (EHEHPA, "Ionquest 801", Albright & Wilson) | | | | |
| Fe | 3.2 | 1.9 | | 1.3 |
| Zn | 1.9 | 1.8 | | 0.1 |
| Mn | 0.4 | 0.4 | << | 0.1 |
| Ni | 0.1 | 0.1 | << | 0.1 |
| 4) 5% by weight phosphoric acid monoalkyl and dialkyl ester of medium chain length ("Knapsack Phosphorsäureester 196", Hoechst) | | | | |
| Fe | 3.2 | 0.1 | | 3.1 |
| Zn | 1.9 | 1.8 | | 0.1 |
| Mn | 0.4 | 0.4 | << | 0.1 |
| Ni | 0.1 | 0.1 | << | 0.1 |

The raffinate (aqueous phase, after) may be used to prepare or to regenerate the phosphating solution. The extract (organic phase, after) was re-extracted to recover the organic solvent and to utilize the iron.

C) Re-extraction Tests on the Charged Org. Phase (in g/l):

Re-extraction was carried out for 15 minutes in a vibrating funnel at 20° C. using 6-molar hydrochloric acid in a ratio by volume to the organic phase (kerosine) of 1:1 as the re-extractant. Depending on the complexing agent, the following analysis results (in g/l) were obtained:

1) Extract with MEHPA (B 1)

| Metal | Aqueous phase Before | Aqueous phase After | Organic phase After |
|---|---|---|---|
| Fe | 3.0 | 0.3 | 2.6 |
| 2) Extract with DEHPA (B2a and b) | | | |
| 0.5 m: Fe | 9.4 | 0.4 | 8.9 |
| 0.2 m: Fe | 3.6 | 0.1 | 3.4 |
| 3) Extract with EHEHPA (B3) (conditions: 6 M HCl or 1 M H₂SO₄) | | | |
| HCl: Fe | 3.2 | 0.1 | 3.1 |
| H₂SO₄: Fe | 2.9 | 0.8 | 1.9 |

The examples show how selectively and completely the iron is extracted and re-extracted even in a single-stage arrangement. In practice, the effectiveness of extraction and re-extraction can be further increased by continuous multistage installations.

We claim:

1. A process for recycling phosphating sludge which accumulates in the zinc phosphating of metal surfaces and which, in addition to phosphate and small quantities of other metals, contains an excess of iron over zinc, said process comprising steps of:
    (a) converting the phosphating sludge into an aqueous mineral acid solution using a mineral acid selected from the group consisting of hydrochloric acid, nitric acid and sulfuric acid,
    (b) adjusting the pH value of the aqueous solution obtained in accordance with (a) to values of <0.85,
    (c) contacting the aqueous solution obtained in accordance with (b) with an extractant consisting essentially of (i) a water-insoluble organic solvent, (ii) a complexing agent for iron(III) ions selected from the group consisting of acids of phosphorus soluble in the organic solvent and corresponding to general formula (I):

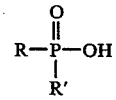

in which R and R' are selected from the group consisting of OH, alkyl, aralkyl, alkoxy and alkylphenoxy and R and R' may be the same or different, but cannot both be OH, and, optionally, (iii) a solubilizer,
    (d) selectively removing iron from the aqueous solution obtained after step (b) by liquid/liquid extraction with the extractant recited in step (c), and
    (e) reusing the aqueous solution obtained as raffinate after the liquid/liquid extraction of step (d) in a phosphating process.

2. A process as claimed in claim 1, wherein the aqueous solution in equilibrium with the extractant after extraction in step (d) is clear.

3. A process as claimed in claim 2, wherein the iron in the organic phase obtained after the liquid/liquid extraction in step (d) is re-extracted with aqueous mineral acid and the extractant is reused.

4. A process as claimed in claim 3, wherein the iron is converted into its oxide by spray roasting of the aqueous re-extraction solution and the mineral acid accumulating is reused for re-extraction.

5. A process as claimed in claim 1, wherein the complexing agent used in step (c) is selected from the group consisting of phosphoric acid monoalkyl and dialkyl esters, alkyl phosphonic acid monoalkyl esters, dialkyl phosphinic acids and mixtures thereof, the alkyl groups, which may be the same or different, containing 6 to 16 carbon atoms and being branched.

6. A process as claimed in claim 5, wherein phosphoric acid mono-2-ethylhexyl ester is used as the complexing agent.

7. A process as claimed in claim 6, wherein the iron in the organic phase obtained after the liquid/liquid extraction in step (d) is re-extracted with aqueous mineral acid and the extractant is reused.

8. A process as claimed in claim 7, wherein the iron is converted into its oxide by spray roasting of the aqueous re-extraction solution and the mineral acid accumulating is reused for re-extraction.

9. A process as claimed in claim 5, wherein the iron in the organic phase obtained after the liquid/liquid extraction in step (d) is re-extracted with aqueous mineral acid and the extractant is reused.

10. A process as claimed in claim 9, wherein the iron is converted into its oxide by spray roasting of the aqueous re-extraction solution and the mineral acid accumulating is reused for re-extraction.

11. A process as claimed in claim 1, wherein kerosine is a constituent of the extractant used in step (c).

12. A process as claimed in claim 11, wherein the iron in the organic phase obtained after the liquid/liquid extraction in step (d) is re-extracted with aqueous mineral acid and the extractant is reused.

13. A process as claimed in claim 6, wherein the iron is convened into its oxide by spray roasting of the aqueous re-extraction solution and the mineral acid accumulating is reused for re-extraction.

14. A process as claimed in claim 1, wherein the complexing agent used in step (c) is selected from the group consisting of phosphoric acid monoalkyl and dialkyl esters, alkyl phosphonic acid monoalkyl esters, dialkyl phosphinic acids and mixtures thereof, the alkyl groups, which may be the same or different, containing 4 to 20 carbon atoms.

15. A process as claimed in claim 14, wherein the iron in the organic phase obtained after the liquid/liquid extraction in step (d) is re-extracted with aqueous mineral acid and the extractant is reused.

16. A process as claimed in claim 15, wherein the iron is converted into its oxide by spray roasting of the aqueous re-extraction solution and the mineral acid accumulating is reused for re-extraction.

17. A process as claimed in claim 1, wherein a water-insoluble organic solvent which is capable of dissolving both the complexing agent and the complex formed with iron is a constituent of the extractant used in step (c).

18. A process as claimed in claim 17, Wherein the iron in the organic phase obtained after the liquid/liquid extraction in step (d) is re-extracted with aqueous mineral acid and the extractant is reused.

19. A process as claimed in claim 18, wherein the iron is converted into its oxide by spray roasting of the aqueous re-extraction solution and the mineral acid accumulating is reused for re-extraction.

20. A process as claimed in claim 1, wherein the iron in the organic phase obtained after the liquid/liquid extraction in step (d) is re-extracted with aqueous mineral acid and the extractant is reused.

* * * * *

UNITED STATES PATENT AND TRADEMARK OFFICE
CERTIFICATE OF CORRECTION

PATENT NO. : 5,350,517
DATED : September 27, 1994
INVENTOR(S) : Buchmeier et. al.

It is certified that error appears in the above-indentified patent and that said Letters Patent is hereby corrected as shown below:

In claim 1, column 5, line 68, "HI", should read:
-- III --.

In claim 13, column 6, line 65, "claim 6", should read:
-- claim 12 --.

In claim 13, column 6, line 66, "convened", should read:
-- converted --.

In claim 18, column 8, line 4, "Wherein", should read:
-- wherein --.

Signed and Sealed this

Eleventh Day of July, 1995

*Attest:*

BRUCE LEHMAN

*Attesting Officer*  *Commissioner of Patents and Trademarks*